United States Patent Office 3,105,304
Patented Oct. 1, 1963

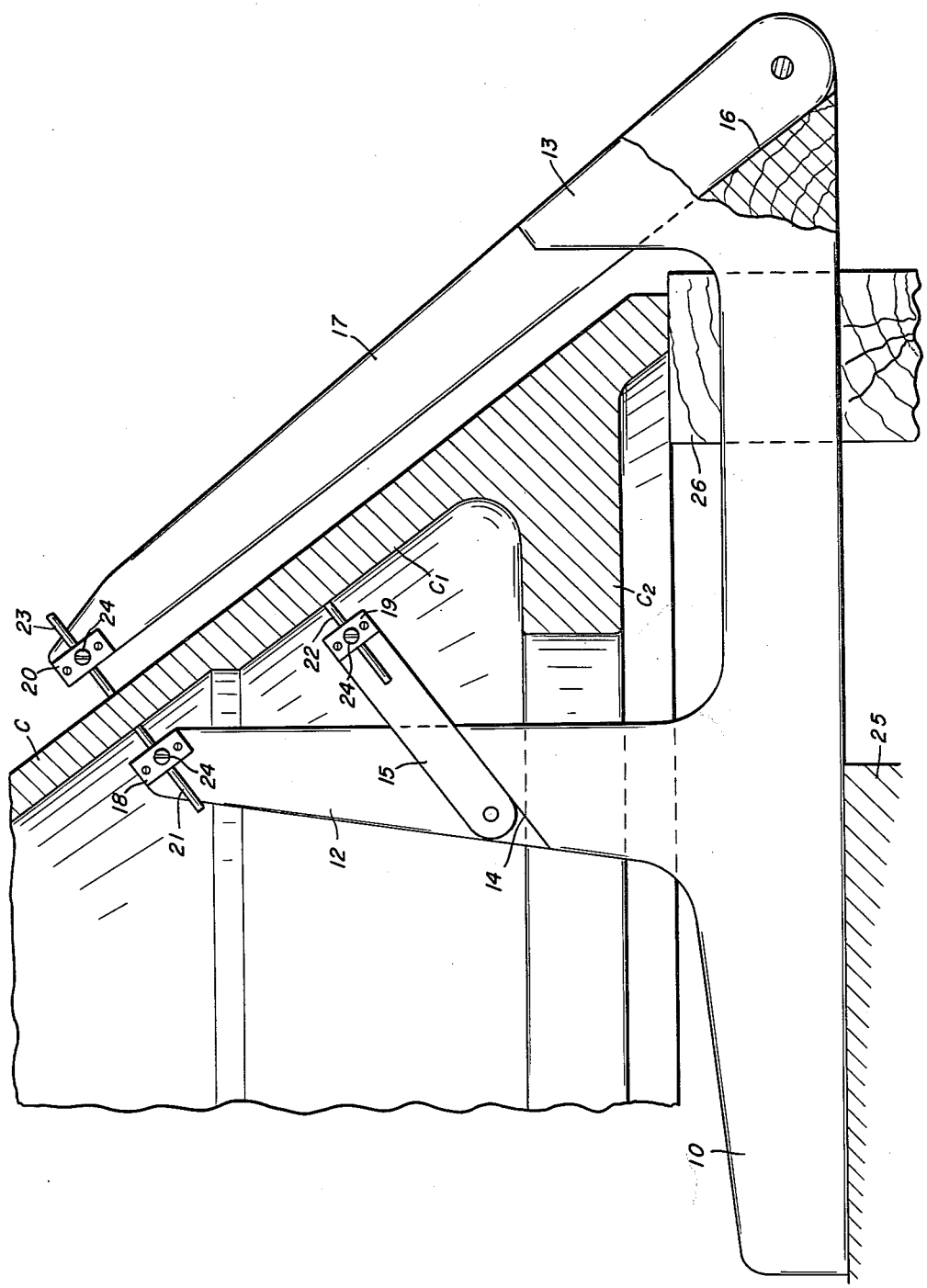

3,105,304
THICKNESS GAGE FOR CONICAL ARTICLES
Homer C. Hanks, Westmont Borough, Pa., assignor to United States Steel Corporation, a corporation of New Jersey
Filed Aug. 9, 1961, Ser. No. 130,397
2 Claims. (Cl. 33—143)

This invention relates to an improved gage for measuring the wall thickness of a large conical article, such as a casting for a blast furnace bell.

An object of the invention is to provide an improved gage of simple construction for quickly and accurately measuring the wall thickness of a conical article.

A further object is to provide a gage for measuring the wall thickness of a rough conical casting preparatory to machining, which gage opens in a way to enable it to be installed over obstructions on the casting.

In accomplishing these and other objects of the invention, I have provided improved details of structure, a preferred form of which is shown in the accompanying drawing, in which the single FIGURE is a side elevational view of my improved gage positioned for measuring the thickness of a casting for a blast furnace bell.

My gage includes an integral inverted T-shaped frame formed of a base 10, an upright 12 intermediate the length of the base and an extension 13 of triangular outline at one end of the base. One face of the upright 12 has a shoulder 14 intermediate its height and sloping upwardly perpendicular to the inside conical surface of an article C with which I use the gage. A relatively short arm 15 is pivoted to the upright in a position to rest on shoulder 14. The extension 13 is bifurcated to form an internal shoulder 16 which slopes upwardly parallel with the outside conical surface of article C (i.e. perpendicular to shoulder 14). A relatively long arm 17 is pivoted to base 10 within the bifurcation in a position to rest on shoulder 16. Conveniently I can construct these parts of my gage of plywood. The frame can be constructed of three thicknesses of quarter inch plywood, and I can cut away one of the outside thicknesses to form shoulder 14 and cut away the middle thickness to form the bifurcation and shoulder 16.

Respective bearing blocks 18, 19 and 20 are fixed to the extremities of upright 12, short arm 15 and long arm 17. Rods 21, 22 and 23 are slidably mounted in the respective blocks 18, 19 and 20, and in each instance are held in place with an adjustable set screw 24 threadedly engaged with the block. Each rod extends perpendicular to the adjacent surface of article C.

Before using the gage to measure the wall thickness of an article C, I support the article over a table 25 on blocks 26 at spaced locations around its lower circumference. The article is illustrated as a rough casting for the large bell of a blast furnace, and it includes an internally thickened wall portion $C_1$ and an internal ledge $C_2$. I open arms 15 and 17 so that I can place the gage over the lower edge of the casting without interference from the obstructing ledge $C_2$ and I rest the base 10 on table 25. I then swing arms 15 and 17 to positions in which they engage shoulders 14 and 16, and adjust rods 21, 22 and 23 to positions in which they contact the inner and outer surfaces of the article and tighten the set screws 24. As the drawing shows, the parts are dimensioned so that rods 21 and 23 contact the thinner portion of the wall of the article opposite each other, while rod 22 contacts the thicker portion $C_1$ of the wall. After I adjust the rods, I open the arms and remove the gage. By measuring the position of the rods, I know the wall thicknesses of the article. The rods can be suitably calibrated for this purpose. I then repeat this measurement at different places around the circumference of the article, and take a separate measurement of the diameter at each place I measure wall thickness. In this example, these measurements furnish the information needed to machine the rough casting to form a balanced bell.

From the foregoing description, it is seen my invention affords a gage of simple construction for conveniently and accurately measuring the wall thickness of large conical castings or similar articles. The particular gage illustrated is intended especially for measuring a blast furnace bell, but it is apparent a gage of this type can readily be designed for measuring other articles where the problems are analogous.

While I have shown and described only a single embodiment of my invention, it is apparent that modifications may arise. Therefore, I do not wish to be limited to the disclosure set forth but only by the scope of the appended claims.

I claim:
1. A gage comprising an integral inverted T-shaped frame formed of a base, an upright intermediate the length of said base and an extension at one end of said base, means forming a first shoulder on said upright intermediate the height thereof, a relatively short arm pivoted to said upright in a position to rest on said first shoulder, means forming a second shoulder on said extension, said second shoulder extending perpendicular to said first shoulder, a relatively long arm pivoted to said base in a position to rest on said second shoulder, opposed rods adjustably mounted on the extremities of said upright and said long arm adapted to contact opposite sides of the wall of a conical article to measure the wall thickness, and another rod adjustably mounted on said short arm to measure the wall thickness below said opposed rods, said arms being adapted for opening to install the gage over obstructions on the article.

2. A gage as defined in claim 1 in which said frame is constructed of a plurality of thicknesses of plywood, one thickness being cut away to form said first named shoulder, and one thickness being cut away to form said second named shoulder.

References Cited in the file of this patent
UNITED STATES PATENTS

| | | |
|---|---|---|
| 862,765 | Shaffer | Aug. 6, 1907 |
| 2,876,551 | Bowlby | Mar. 10, 1959 |

FOREIGN PATENTS

| | | |
|---|---|---|
| 10,617 | Great Britain | 1908 |